(12) United States Patent
Kitamura

(10) Patent No.: US 9,992,159 B2
(45) Date of Patent: Jun. 5, 2018

(54) COMMUNICATION INFORMATION DETECTING DEVICE AND COMMUNICATION INFORMATION DETECTING METHOD

(71) Applicant: NEC Corporation, Tokyo (JP)

(72) Inventor: Hiroshi Kitamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 14/406,316

(22) PCT Filed: Mar. 21, 2013

(86) PCT No.: PCT/JP2013/001911
§ 371 (c)(1),
(2) Date: Dec. 8, 2014

(87) PCT Pub. No.: WO2013/186969
PCT Pub. Date: Dec. 19, 2013

(65) Prior Publication Data
US 2015/0188880 A1    Jul. 2, 2015

(30) Foreign Application Priority Data

Jun. 11, 2012 (JP) .................................. 2012-132204
Nov. 30, 2012 (JP) ................................. 2012-262624

(51) Int. Cl.
*G06F 15/16* (2006.01)
*H04L 29/12* (2006.01)
*H04L 29/08* (2006.01)

(52) U.S. Cl.
CPC ........ *H04L 61/2007* (2013.01); *H04L 61/103* (2013.01); *H04L 61/2092* (2013.01); *H04L 61/6059* (2013.01); *H04L 67/10* (2013.01)

(58) Field of Classification Search
CPC . H04L 29/12018; H04L 61/10; H04L 61/103; H04L 29/12028
(Continued)

(56) References Cited

U.S. PATENT DOCUMENTS 5,854,901 A * 12/1998 Cole ................. H04L 29/12018
709/222
6,532,217 B1 * 3/2003 Alkhatib ................. H04L 29/06
370/252
(Continued)

FOREIGN PATENT DOCUMENTS

JP       2004-185498 A       7/2004
JP       2005-260615 A       9/2005
(Continued)

OTHER PUBLICATIONS

T. Narten, et al., "Neighbor Discovery for IP Version 6 (IPv6)", Network Working Group, Dec. 1998, pp. 1-72.
(Continued)

*Primary Examiner* — Phuoc Nguyen
(74) *Attorney, Agent, or Firm* — Sughrue Mion, PLLC

(57) ABSTRACT

A communication information detecting device includes: a receiving unit that receives an address resolution request message transmitted from a start-point communication device through L2 broadcast and having an IP address of a target communication device set therein as a target address for L2 address resolution; a generating unit that generates an address resolution request message having the IPv6 address of the target communication device, which is set in the received address resolution request message, set therein as a target address for L2 address resolution; a follow-up processing unit that transmits this address resolution request message through L2 broadcast; a receiving unit that receives an address resolution reply message returned from the target communication device in response to the address resolution
(Continued)

request message; and a detecting unit that extracts an L2 address and an IP address concerning the target communication device from the address resolution reply message.

15 Claims, 8 Drawing Sheets

(58) Field of Classification Search
 USPC .......................................................... 709/227
 See application file for complete search history.

(56) References Cited

U.S. PATENT DOCUMENTS

| | | | | |
|---|---|---|---|---|
| 6,850,495 | B1* | 2/2005 | Baum | H04L 12/4641 370/256 |
| 7,567,573 | B2* | 7/2009 | Foss | H04L 29/12009 370/392 |
| 2008/0008183 | A1* | 1/2008 | Takagaki | H04L 45/00 370/392 |
| 2008/0301407 | A1* | 12/2008 | Albert | H04L 29/12028 712/31 |
| 2010/0241744 | A1 | 9/2010 | Fujiwara | |
| 2011/0153841 | A1* | 6/2011 | Yoshida | H04L 12/4625 709/227 |
| 2011/0182293 | A1 | 7/2011 | Seo et al. | |

FOREIGN PATENT DOCUMENTS

| | | | |
|---|---|---|---|
| JP | 2006-287299 | A | 10/2006 |
| JP | 2008-278193 | A | 11/2008 |
| JP | 2010-220066 | A | 9/2010 |
| JP | 2010-258972 | A | 11/2010 |
| JP | 2012-502544 | A | 1/2012 |
| WO | 2010/110530 | A1 | 9/2010 |
| WO | 2011/123007 | A1 | 10/2011 |

OTHER PUBLICATIONS

International Search Report for PCT/JP2013/001911 dated Jun. 11, 2013.

Communication dated Sep. 6, 2016 from the Japanese Patent Office in counterpart application No. 2014-520870.

\* cited by examiner

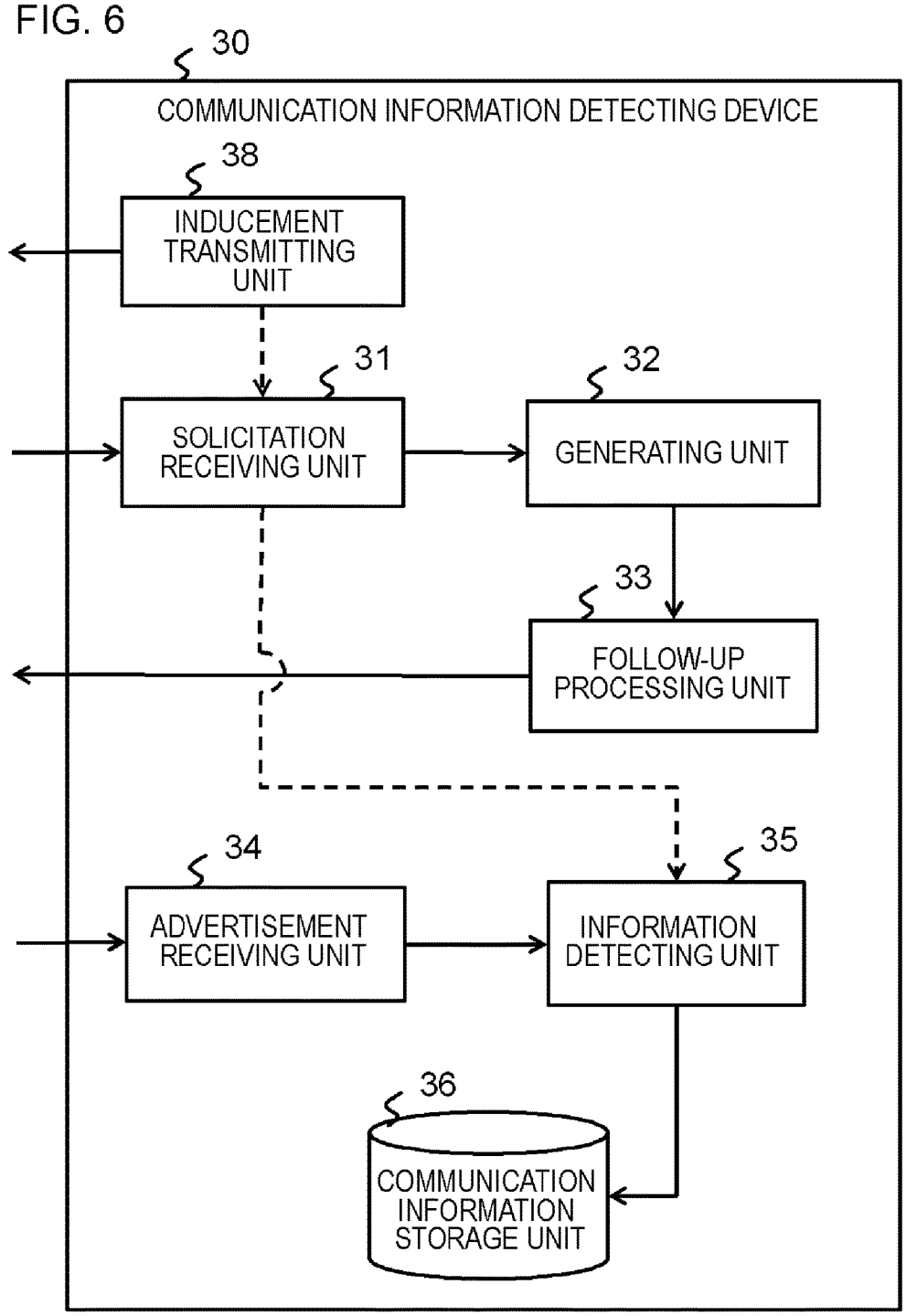

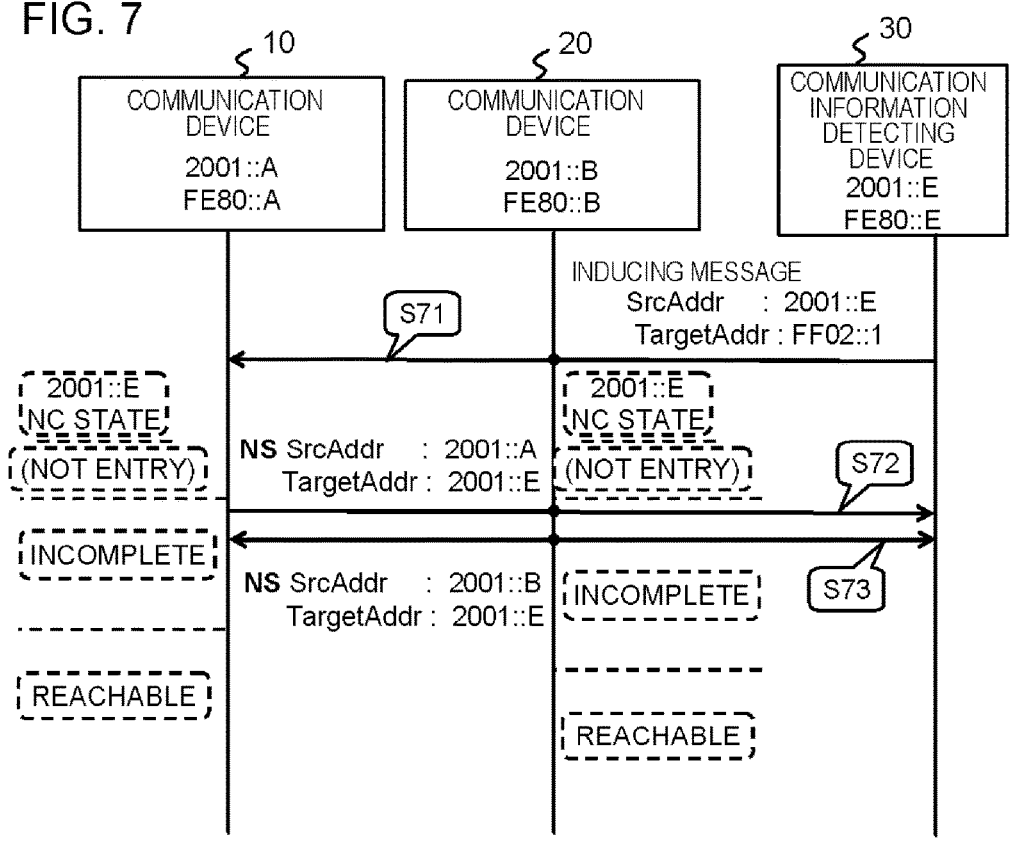

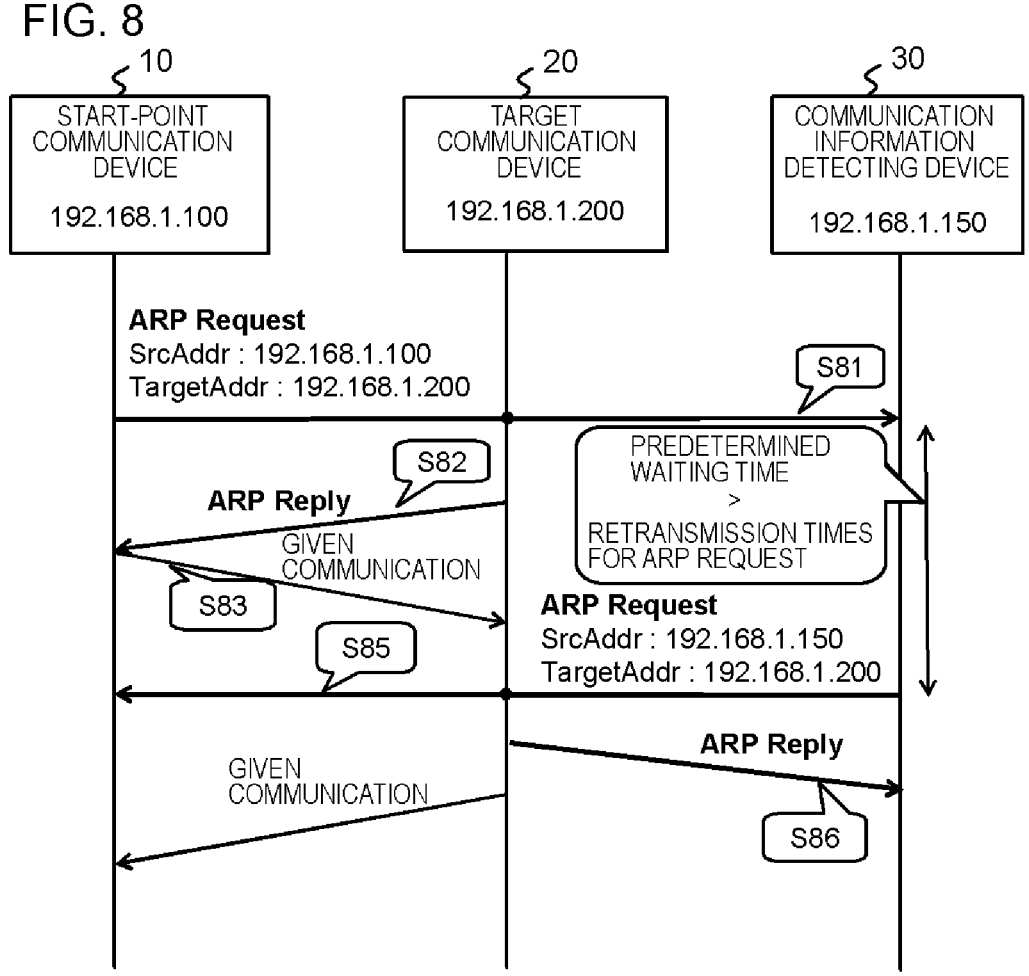

COMMUNICATION INFORMATION DETECTING DEVICE AND COMMUNICATION INFORMATION DETECTING METHOD

CROSS REFERENCE TO RELATED APPLICATIONS

This application is a National Stage of International Application No. PCT/JP2013/001911 filed Mar. 21, 2013 claiming priority based on Japanese Patent Application Nos. 2012-132204 filed Jun. 11, 2012 and 2012-262624 filed Nov. 30, 2012, the contents of all of which are incorporated herein by reference in their entirety.

TECHNICAL FIELD

The present invention relates to a technique of managing an Internet Protocol (IP).

BACKGROUND ART

These days, various terminals such as a personal computer and a portable unit support IPv6, and IPv6 packets are already running in networks. Furthermore, currently, IPv6 addresses are the only available global addresses that can be newly acquired, which further rapidly accelerates a shift in networks to IPv6. This shift will further increase the number of environments where IPv4 and IPv6 coexist.

Patent Document 1 listed below describes data link layer (hereinafter, referred to as L2) address resolution and Neighbor Discovery Protocol (NDP) as functions of IPv6. In this NDP, states of each entry in a Neighbor Cache of each node are updated on the basis of a Neighbor Solicitation (NS) message and a Neighbor Advertisement (NA) message.

Furthermore, Patent Document 2 listed below proposes using a function of Duplicate Address Detection (DAD) of IPv6 to detect unauthorized access to a network where IPv4 and IPv6 coexist and block any terminal used for unauthorized access in this network.

RELATED DOCUMENT

Patent Document

Patent Document 1: Japanese Patent Application Laid-open No. 2010-258972
Patent Document 2: Japanese Patent Application Laid-open No. 2006-287299

SUMMARY OF THE INVENTION

Problem to be Solved by the Invention

However, with the technique proposed in Patent Document 2 described above, it is not possible to solve the following fundamental problem associated with the application of IPv6.

Currently, usage modes of IPv6 are not fully identified in public networks as well as in private networks such as corporate networks. For example, in a certain network, management is not performed as to whether or not each terminal supports IPv6 or whether or not each terminal performs IPv6 communication.

Such a situation can be explained using the following characteristics of IPv6. First, in IPv6, one network interface has plural IPv6 addresses set thereto. For each of the IPv6 addresses, a scope such as a link local scope, a global scope, and a unique local scope is set. Plural IPv6 addresses including, for example, a link-local address, a global address, and a unique local address are set according to the scopes.

Furthermore, IPv6 has a function of automatically setting addresses. For example, the link-local address is automatically set according to a data link layer address (for example, a Media Access Control (MAC) address) when an IPv6 protocol stack starts. Further, the global address is automatically set according to a Router Advertisement (RA) or a Dynamic Host Configuration Protocol for IPv6 (DHCPv6). Alternatively, the IPv6 address can be set manually. In addition, states of the IPv6 addresses are managed, and there may also exists an address to be updated such as a temporary address as defined in Request for Comments (RFC) 3041, or an address to be abandoned due to expiration.

As described above, under the IPv6 environment, each communication device has plural IPv6 addresses set therein in a state where users do not intend to do so, and the IPv6 addresses set are updated with time. Thus, it is extremely difficult to correctly identify the usage mode of the IPv6.

However, the widespread introduction of IPv6 in the unmanaged state as described above may result in a certain type of chaos. Such a chaotic state may cause communication problems such as communication failure or delay in communication and so on. For example, in order to migrate from IPv4 to IPv6, a fallback process is performed, in which communication stack of each terminal preferentially performs IPv6 communication and performs IPv4 communication upon failure of the IPv6 communication. In this fallback process, waiting times are usually set to determine the failure of IPv6 communication, which causes a delay in communication.

Thus, concerning the introduction of IPv6, it is important to correctly organize the chaotic state as described above, and reduce the effect of communication failure. In other words, it is important to correctly identify the usage modes of IPv6 in the network. However, if there were many restrictions on subjects to be detected in order to perform this identification, it would not be possible to deal with the enormous number of and various modes of networks that currently exist. The restriction on the subjects to be detected includes, for example, a need to add functions or correct functions for each communication device serving as the subject to be detected, and conditions for network modes.

However, even if IPv6 further penetrates, it is still important to identify the usage mode of IPv6 as well as the usage mode of IPv4.

The present invention has been made in view of the facts as described above, and provides a technique, with a high versatility, of identifying the usage mode of IP of various communication devices.

Means for Solving the Problem

In order to solve the problems described above, each mode of the present invention employs the following configurations.

The first aspect relates to a communication information detecting device. The communication information detecting device according to the first aspect includes: a solicitation receiving unit that receives an address resolution request message transmitted from a start-point communication device through data link layer broadcast and having an IP address of a target communication device set therein as a target address for data link layer address resolution; a generating unit that generates an address resolution request message having the IP address of the target communication device, which is set in the address resolution request message received by the solicitation receiving unit, set therein as a target address for data link layer address resolution; a follow-up processing unit that transmits the address resolution request message generated by the generating unit through data link layer broadcast; an advertisement receiving unit that receives an address resolution reply message returned from the target communication device through unicast in response to the address resolution request message transmitted by the follow-up processing unit; and an information detecting unit that extracts a data link layer address and an IP address concerning the target communication device from the address resolution reply message received by the advertisement receiving unit.

The second aspect relates to a communication information detecting method. In the communication information detecting method according to the second aspect, a communication device: receives an address resolution request message transmitted from a start-point communication device through data link layer broadcast and having an IP address of a target communication device set therein as a target address for data link layer address resolution; generates an address resolution request message having the IP address of the target communication device, which is set in the address resolution request message received, set therein as a target address for data link layer address resolution; transmits the generated address resolution request message through data link layer broadcast; receives an address resolution reply message returned from the target communication device through unicast in response to the transmitted address resolution request message; and extracts a data link layer address and an IP address concerning the target communication device from the received address resolution reply message.

It should be noted that another aspect according to the present invention may include a program that causes a computer to realize the configuration of the communication information detecting device according to the first aspect described above, and a computer-readable storage medium that records such a program. This storage medium includes a non-transitory tangible medium.

Effect of the Invention

According to each of the aspects described above, it is possible to provide a technique, with a high versatility, of identifying the usage mode of IP of various communication devices.

BRIEF DESCRIPTION OF THE DRAWINGS

The above-described object and other objects of the present invention, and features and advantages of the present invention will be made further clear by the preferred embodiment described below and the following drawings attached thereto.

FIG. 6 is a diagram schematically illustrating an example of a process configuration of a communication information detecting device according to the third exemplary embodiment.

FIG. 7 is a sequence chart illustrating an example of operations performed by the communication information detecting device according to the third exemplary embodiment.

FIG. 8 is a sequence chart illustrating an example of operations performed by a communication information detecting device according to the fourth exemplary embodiment.

DESCRIPTION OF EMBODIMENTS

Below, exemplary embodiments according to the present invention will be described. Note that exemplary embodiments described below are merely examples, and the present invention is not limited to the configurations of the exemplary embodiments described below.

First Exemplary Embodiment

[Device Configuration]

Figure 1:
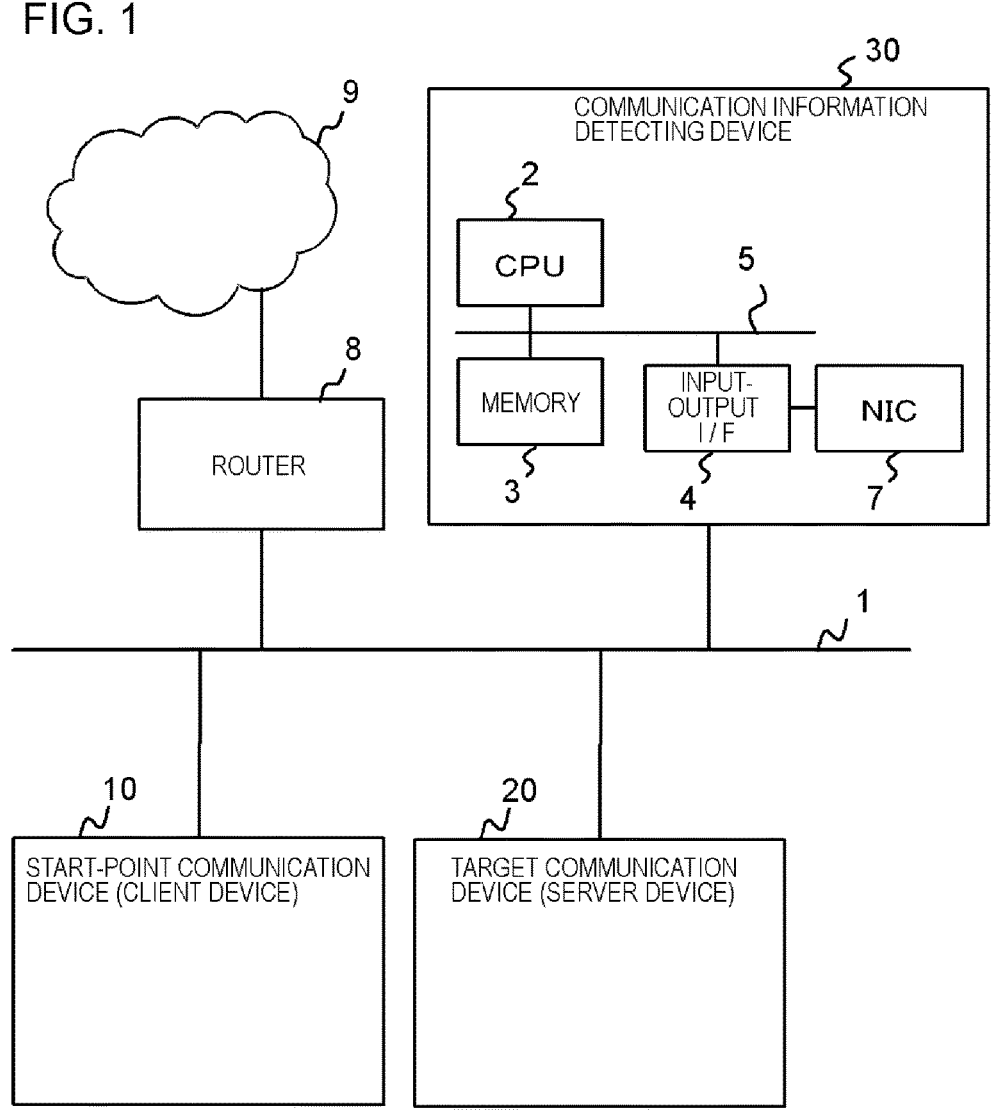
FIG. 1 is a diagram schematically illustrating an example of a hardware configuration of a communication information detecting device according to the first exemplary embodiment.

FIG. 1 is a diagram schematically illustrating an example of a hardware configuration of a communication information detecting device according to the first exemplary embodiment. A communication information detecting device (hereinafter, simply referred to as a detecting device) 30 is communicably connected through a network 1 to a start-point communication device 10 and a target communication device 20. The network 1 is connected through a router 8 to an external network 9 so as to be able to communicate with each other. With these configurations, messages transmitted from a communication device in the network 1 through data link layer (hereinafter, also referred to as L2) broadcast reach a detecting device 30. Note that the network 1 may contain a relay device such as a switching hub and a repeater hub, not illustrated.

The start-point communication device 10 is, for example, a client device, and the target communication device 20 is, for example, a server device. In this exemplary embodiment, it is only necessary that the start-point communication device 10 and the target communication device 20 are communication devices having known IPv6 communication functions, and hardware configurations and software configurations thereof are not limited. Hereinafter, the start-point communication device 10 and the target communication device 20 are also simply referred as communication devices.

The detecting device 30 according to the first exemplary embodiment includes, for example, a central processing unit (CPU) 2, a memory 3, and an input-output interface (I/F) 4, and so on, which are connected with each other, for example, through a bus 5. The memory 3 includes, for example, a random access memory (RAM), a read only memory (ROM), a hard disk, and a portable storage medium. The input-output I/F 4 is connected to a network interface card (NIC) 7 that communicates with other communication devices through the network 1. The input-output I/F 4 may be connected to a display device or a user interface device such as an input device. In this exemplary embodiment, the hardware configuration of the detecting device 30 is not limited.

Figure 2:
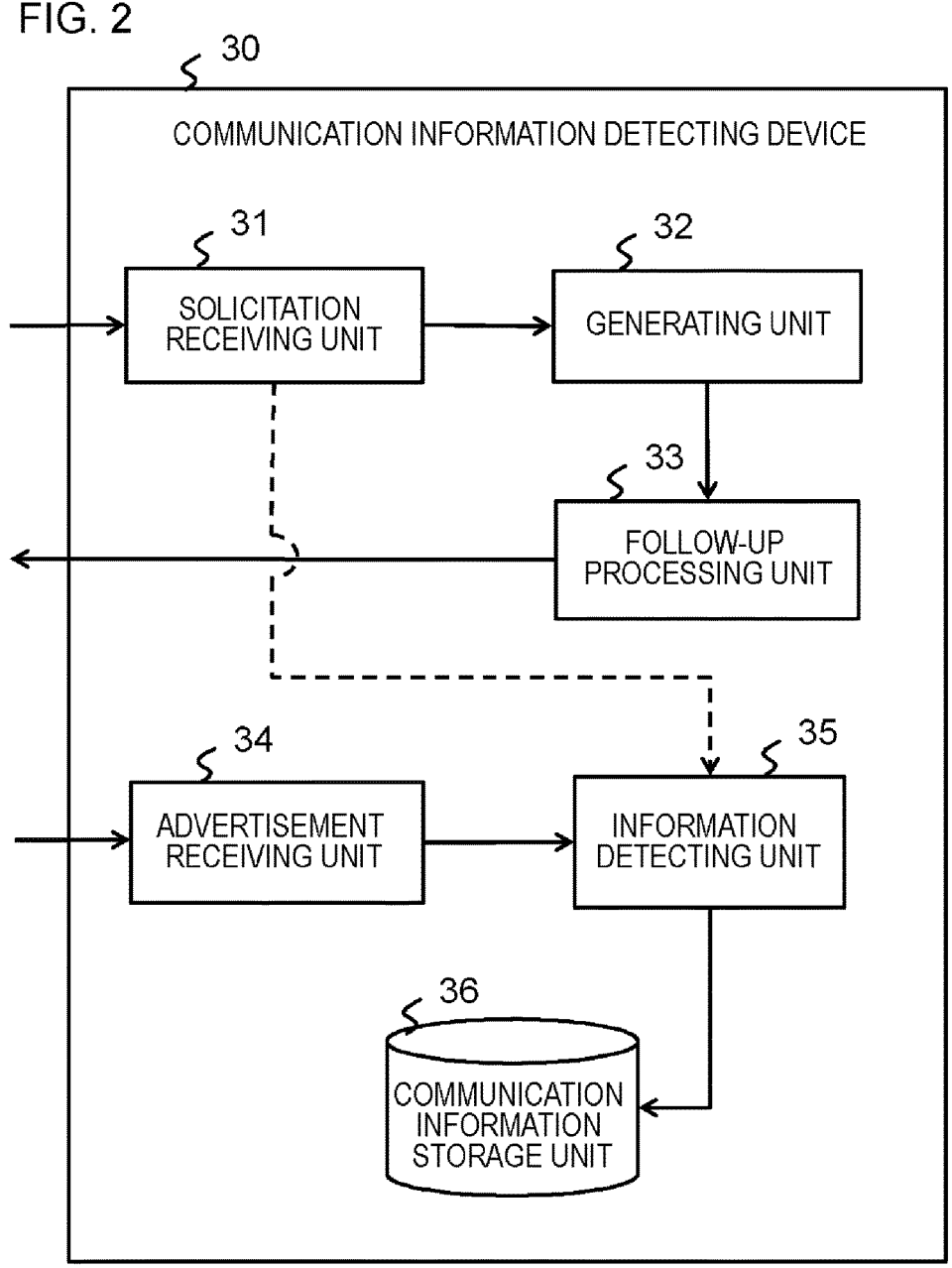
FIG. 2 is a diagram schematically illustrating an example of a process configuration of the communication information detecting device according to the first exemplary embodiment.

FIG. 2 is a diagram schematically illustrating an example of a process configuration of the detecting device 30 according to the first exemplary embodiment. As illustrated in FIG. 2, the detecting device 30 includes, for example, a solicitation receiving unit 31, a generating unit 32, a follow-up processing unit 33, an advertisement receiving unit 34, an information detecting unit 35, a communication information storage unit 36, and so on. In the detecting device 30, each of the processing modules described above is realized with the CPU 2 running a program stored in the memory 3. Such a program is installed, for example, from a portable storage medium such as a compact disc (CD) and a memory card, or from other devices on the network through the input-output I/F 4, and then, is stored in the memory 3.

The solicitation receiving unit 31 receives a Neighbor Solicitation message transmitted from the start-point communication device 10 through L2 broadcast and having an IPv6 address of the target communication device 20 set therein as a target address for L2 address resolution. Hereinafter, the Neighbor Solicitation message is referred to as an NS (Neighbor Solicitation) message. The NS message is defined by NDP as described above, and is usually transmitted through L2 broadcast and L3 multicast. The NS message for this L2 address resolution may also be called an address resolution request message. The solicitation receiving unit 31 uses, for example, a promiscuous mode of NIC 7 to receive the NS message, which reaches an L2 protocol stack of the detecting device 30 through L2 broadcast.

The generating unit 32 generates an NS message having the IPv6 address of the target communication device 20, which is set in the NS message received by the solicitation receiving unit 31, set therein as a target address for L2 address resolution. The generating unit 32 may generate this NS message by replacing the transmission source address of the NS message received by the solicitation receiving unit 31, with an address of the detecting device 30.

The follow-up processing unit 33 transmits the NS message generated by the generating unit 32 through L2 broadcast. This NS message is transmitted following the NS message transmitted by the start-point communication device 10, and hence, hereinafter, the NS message transmitted by the follow-up processing unit 33 is also referred to as a follow-up NS message.

The advertisement receiving unit 34 receives a Neighbor Advertisement message returned from the target communication device 20 through unicast in response to the NS message transmitted by the follow-up processing unit 33. Hereinafter, the Neighbor Advertisement message is referred to as an NA message. This NA message is a unicast message to the detecting device 30. This NA message may also be called an address resolution reply message.

The information detecting unit 35 extracts an L2 address and an IPv6 address concerning the target communication device 20 from the NA message received by the advertisement receiving unit 34. More specifically, the IPv6 address is acquired from the target address of the NA message, and the L2 address is acquired from the transmission source address in an L2 header of the NA message. However, the IPv6 address may be acquired from the transmission source address in an IP header of the NA message. The information detecting unit 35 stores the extracted L2 address and IPv6 address in the communication information storage unit 36 in a manner such that they are associated with each other. Note that the NS message and the NA message are well known (see the reference described below, for example), and hence, detailed descriptions thereof will not be made in this specification.

Reference: T. Narten, etc., "Neighbor Discovery for IP Version 6 (IPv6)", RFC2461, the Internet Society The information detecting unit 35 may extract an L2 address and an IPv6 address concerning the start-point communication device 10 from transmission source information set in the above-described NS packet received by the solicitation receiving unit 31. In this case, the information detecting unit 35 may store the extracted L2 address and IPv6 address concerning the start-point communication device 10 in the communication information storage unit 36 in a manner such that they are associated with each other.

The communication information storage unit 36 stores the L2 address and the IPv6 address so as to be associated with each other. As described above, in IPv6, plural IPv6 addresses are set to one network interface. Thus, the communication information storage unit 36 stores plural IPv6 addresses so as to be associated with one L2 address.

[Example of Operation]

Figure 3:
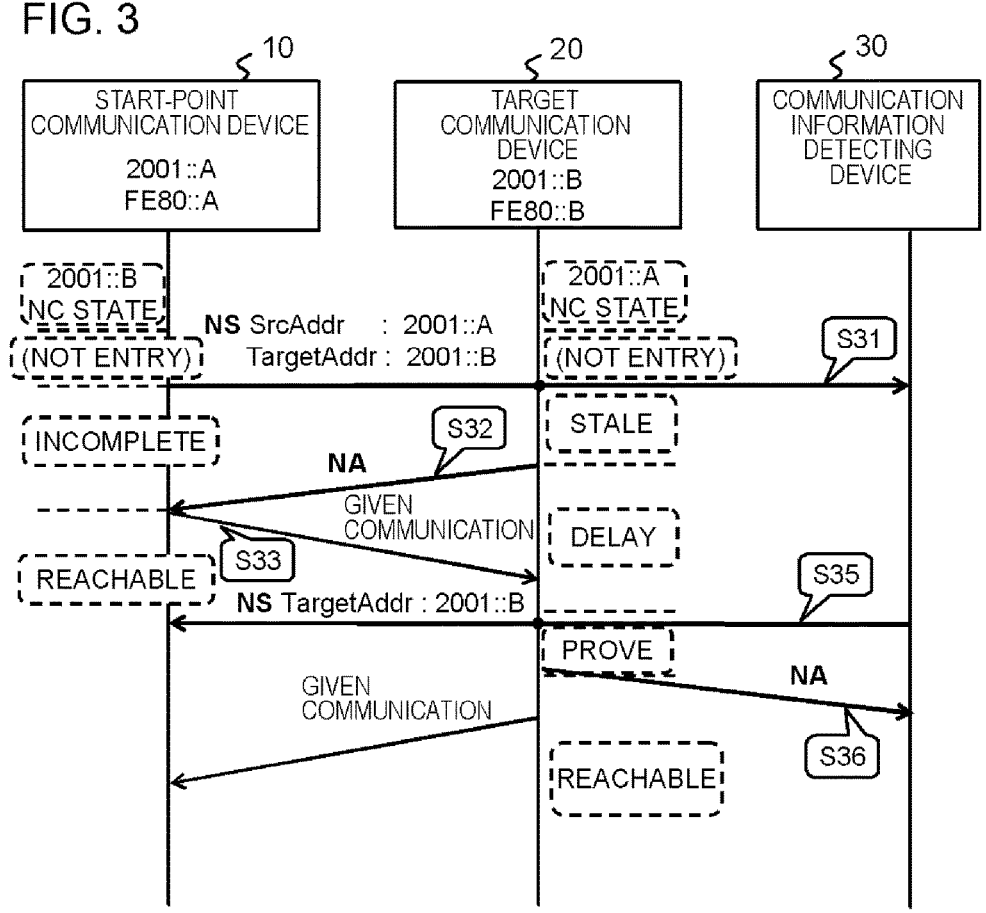
FIG. 3 is a sequence chart illustrating an example of operations performed by the communication information detecting device according to the first exemplary embodiment.

Below, a communication information detecting method according to the first exemplary embodiment will be described with reference to FIG. 3. FIG. 3 is a sequence chart illustrating an example of operations performed by the detecting device 30 according to the first exemplary embodiment.

In FIG. 3, in each of rectangular boxes indicating the start-point communication device 10 and the target communication device 20, IPv6 addresses of each of the communication devices are indicated. A global address is indicated on the upper side, and a link-local address is indicated on the lower side. Furthermore, in each rectangular box with a dotted line in FIG. 3, a state of a certain entry in a Neighbor Cache is indicated. A state of an entry of an IPv6 address "2001::B" (address of the target communication device 20) is indicated regarding the Neighbor Cache of the start-point communication device 10, and a state of an entry of an IPv6 address "2001::A" (address of the start-point communication device 10) is indicated regarding the Neighbor Cache of the target communication device 20.

When starting a given communication with the target communication device 20, the start-point communication device 10 transmits an NS message for L2 address resolution of the target communication device 20 in the case where no entry concerning the target communication device 20 exists in the Neighbor Cache of this start-point communication device 10 itself (S31). This NS message is transmitted through L2 broadcast, and hence, the target communication device 20 and the detecting device 30 located within the network 1 and not extending beyond the router 8 receive this NS message.

The target communication device 20 detects that the IPv6 address of this target communication device 20 itself is set as the target address of this NS message, thereby transmitting the NA message to the start-point communication device 10 through unicast (S32).

The start-point communication device 10 receives this NA message, whereby the entry concerning the target communication device 20 is registered in the Neighbor Cache. This makes it possible for the start-point communication device 10 to start the given communication with the target communication device 20 (S33). S31, S32, and S33 described above are a general flow of L2 address resolution in association with IPv6.

The detecting device 30 according to the first exemplary embodiment acquires the IPv6 address and the L2 address of the target communication device 20 by taking advantage of the flow of L2 address resolution of IPv6 performed between the start-point communication device 10 and the target communication device 20 as described above. In a similar way, it is possible for the detecting device 30 to acquire the IPv6 address and the L2 address of the start-point communication device 10.

Upon detecting the NS message transmitted from the start-point communication device 10 through L2 broadcast (S31), the detecting device 30 generates an NS message having an IPv6 address of the target communication device 20, which is set in this detected NS message, set therein as the target address of the L2 address resolution, and transmits this generated NS message (S35). Since a follow-up NS message transmitted by the detecting device 30 is transmitted through L2 broadcast, this follow-up NS message is received by the start-point communication device 10 and the target communication device 20.

With these operations, the target communication device 20 detects that the IPv6 address of this target communication device 20 itself is set as the target address of this follow-up NS message, thereby transmitting an NA message to the detecting device 30 through unicast (S36).

Upon receiving the NA message with a destination being the detecting device 30, the detecting device 30 extracts the L2 address and the IPv6 address concerning the target communication device 20 from this received NA message. The detecting device 30 retains this extracted IPv6 address so as to be associated with the L2 address extracted in a similar way. Furthermore, it is possible for the detecting device 30 to acquire the IPv6 address and the L2 address of the start-point communication device 10 on the basis of transmission source information in the NS message received in S31.

[Operation and Effect of First Exemplary Embodiment]

In the first exemplary embodiment, when the NS message for L2 address resolution transmitted by another communication device (start-point communication device 10) is detected, L2 address resolution is performed with the target address being the IPv6 address of the target communication device 20 acquired from this NS message. With this operation, the L2 address of the target communication device 20 is acquired, and as a result, the IPv6 address and the L2 address concerning the target communication device 20 are acquired.

As described above, according to the first exemplary embodiment, using the flow of L2 address resolution of IPv6 performed between the start-point communication device 10 and the target communication device 20, it is possible to acquire the IPv6 address and the L2 address concerning the target communication device 20. Thus, according to the first exemplary embodiment, it is possible to identify the usage mode of IPv6 of various communication devices existing in the network 1. Furthermore, according to the first exemplary embodiment, it is possible to acquire the IPv6 address and the L2 address concerning the start-point communication device 10 on the basis of transmission source information in the NS message.

In order to correctly identify the usage mode of IPv6 of each of the communication devices, it is desirable to acquire a combination of the IPv6 address and the L2 address as in this exemplary embodiment. This is because, if only the IPv6 address is managed, it is not possible to identify which communication device has this IPv6 address. As described above, in IPv6, plural IPv6 addresses are set to one network interface. Thus, if only the IPv6 address is managed, it is not possible to correctly identify the usage mode of IPv6 of each of the communication devices.

Furthermore, according to the first exemplary embodiment, if an L2 address resolution function, which is a general function of IPv6, is provided in the start-point communication device 10 and the target communication device 20, it is not necessary to add a new function or correct the existing function to use the detecting device 30.

Furthermore, in the case where a switching hub exists in the network 1, it is not possible for the detecting device 30 to acquire a unicast message transmitted to another communication device without using a special function such as a mirror port. However, according to the first exemplary embodiment, the NS message transmitted through L2 broadcast is used. Thus, even in the case where the switching hub exists in the network 1, it is possible to obtain the effect as described above.

As described above, according to the first exemplary embodiment, it is possible to correctly identify the usage mode of IPv6 of each of the communication devices in the network 1 with a high versatility, without applying a specific restriction on the subjects to be detected.

In connection with an embodiment related to this exemplary embodiment as described above (hereinafter, referred to as a related exemplary embodiment), there is an embodiment in which the IPv6 address and the L2 address of the target communication device are detected using a DAD function of IPv6 described above. With the DAD function, the start-point communication device transmits an NS message containing the IPv6 address of this start-point communication device itself through L2 broadcast, and in the case where another communication device that receives this NS message already uses this IPv6 address, this communication device, receiving this NS message, returns an NA message to notify that the same address is used. The DAD process is performed when a new IPv6 address is attempted to be set, and is performed to all the IPv6 addresses to be set. Hereinafter, the NS message for the DAD process is referred to as a DAD-NS message.

Thus, by detecting the DAD-NS message, the detecting device according to the related exemplary embodiment can acquire, on the basis of the NS message, the IPv6 address and the L2 address concerning the start-point communication device serving as the transmission source of the NS message.

However, with this related exemplary embodiment, there is a possibility that a combination of the IPv6 address and the L2 address cannot be detected. More specifically, in the case where the DAD-NS message is intentionally not transmitted or unintentionally not transmitted, and in the case the DAD-NS message cannot be detected, the combination of the IPv6 address and the L2 address cannot be detected with this related exemplary embodiment.

An example of the former case includes a communication device that secretly performs a communication behind an administrator's back. There is a possibility that such a communication device is implemented in a manner that intentionally does not transmit the DAD-NA message. Furthermore, an example of the former case includes a communication device that has an IPv6 address set therein in a state of being not connected with the network. Although such a communication device completes the DAD process, there is a possibility that the DAD-NS message does not run in the network.

An example of the latter case includes a server device that had already been operating before the detecting device according to this related exemplary embodiment was connected to the network and that has been operating continuously without disconnecting from the network. Such a server device has already completed the DAD process, and hence, after that, does not transmit the DAD-NS message concerning the IPv6 address in operation.

In this regard, with the detecting device 30 according to the first exemplary embodiment, the NS message in the L2 address resolution flow is used, so that the combination of the IPv6 address and the L2 address can be detected in the case of the communication device which the related exemplary embodiment cannot deal with. Even if a communication device is implemented in a manner that intentionally does not transmit the DAD-NA message, it is less likely that such a communication device is implemented in a manner such that even L2 address resolution is not necessary. Furthermore, even if a communication device completes the DAD process without the DAD-NS message running in the network, it is highly likely that the L2 address resolution is performed in the communication thereafter. Furthermore, as for the server device that operates all the time described above, it is highly likely that another communication device performs the L2 address resolution to this server device.

On the other hand, in general, the server device that operates continuously as described above does not voluntarily transmit the NS message. However, according to the first exemplary embodiment, with the follow-up NS message, this server device is caused to transmit the NA message, and as a result, it is possible to acquire the L2 address and the IPv6 address of such a server device.

It should be noted that the detecting device 30 according to the first exemplary embodiment described above may further perform processes of the communication information detecting device according to this related exemplary embodiment. In this case, it is only necessary to employ a configuration in which the solicitation receiving unit 31 receives the DAD-NS message from the start-point communication device 10, and the information detecting unit 35 extracts, from this DAD-NS message, the IPv6 address and the L2 address concerning the start-point communication device 10.

Second Exemplary Embodiment

In the first exemplary embodiment described above, no description was made of the timing when to transmit the follow-up NS message. More specifically, the follow-up processing unit 33 may transmit the follow-up NS message immediately after receiving the NS message. However, there is a possibility that the NS message transmitted from the start-point communication device 10 is a meaningless one-way message. For example, in the case where there is no communication device whose IPv6 address is an IPv6 address set in the NS message as the target address thereof, or in the case where this communication device is not operating, no NA message corresponding to this NS message is transmitted, and hence, this NS message is a one-way message. If a follow-up NS message is similarly transmitted in response to such a meaningless NS message, this causes unnecessary communication workload in the network 1.

Figure 4:
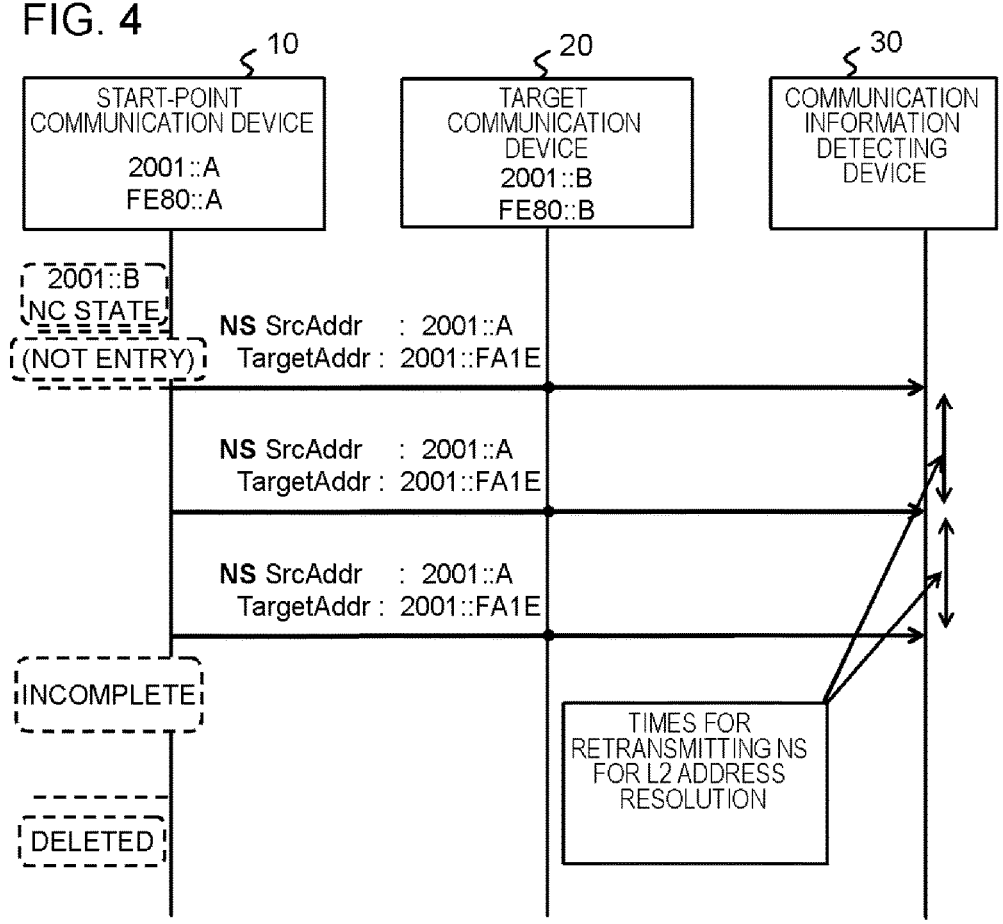
FIG. 4 is a diagram illustrating times for retransmitting NS messages for L2 address resolution.

FIG. 4 is a diagram illustrating times for retransmitting NS messages for L2 address resolution. In the case where an NA message in response to this NS message is not received, the start-point communication device 10 retransmits an NS message after the retransmission time as illustrated in FIG. 4 elapses after the NS message is transmitted. This is part of a general flow of L2 address resolution in IPv6. The retransmission time for the NS message is information that each of the communication devices has as setting information, and is set, for example, to one second.

In this respect, in the detecting device 30 according to the second exemplary embodiment, the follow-up processing unit 33 transmits the follow-up NS message generated by the generating unit 32 after a predetermined waiting time, which is set longer than the retransmission time for this NS message, elapses after the solicitation receiving unit 31 receives the NS message. This predetermined waiting time is set in advance in the memory 3 in an adjustable manner. Note that, as for the hardware configuration and other processing units, the detecting device 30 according to the second exemplary embodiment has a configuration similar to those of the first exemplary embodiment.

More specifically, the follow-up processing unit 33 starts a transmission timer upon receiving the NS message, and transmits the follow-up NS message once this transmission timer indicates that the predetermined waiting time has elapsed. On the other hand, if the NS message retransmitted from the start-point communication device 10 is received again before the predetermined waiting time elapses after the reception of the NS message, the follow-up processing unit 33 initializes this transmission timer according to the time when the retransmitted NS message is received.

Figure 5:
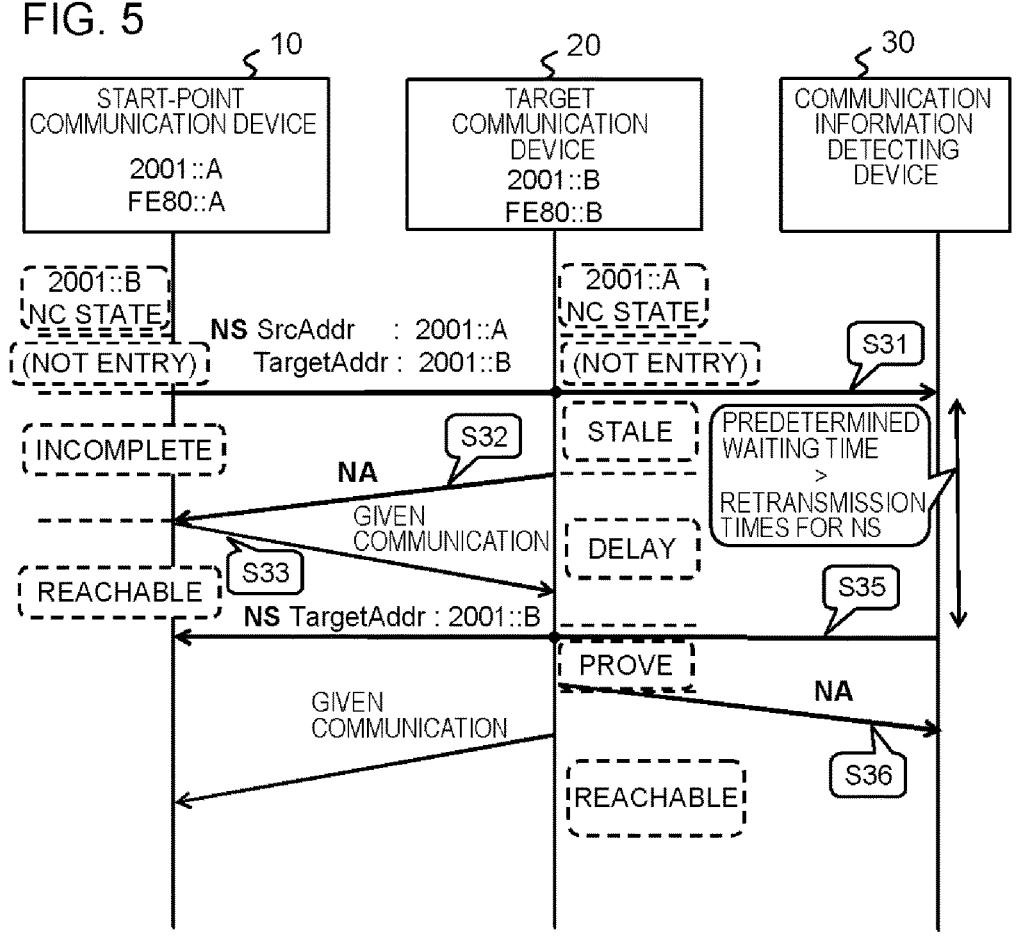
FIG. 5 is a sequence chart illustrating an example of operations performed by a communication information detecting device according to the second exemplary embodiment.

FIG. 5 is a sequence chart illustrating an example of operations performed by the detecting device 30 according to the second exemplary embodiment. As illustrated in FIG. 5, after the predetermined waiting time elapses after the NS message is received (S31), the detecting device 30 according to the second exemplary embodiment transmits the follow-up NS message (S35). Although not illustrated in FIG. 5, in the case where the detecting device 30 receives the retransmitted NS message before the predetermined waiting time elapses after the NS message is received (S31), the detecting device 30 does not transmit the follow-up NS message until the predetermined waiting time elapses after this retransmitted NS message is received.

[Operation and Effect of Second Exemplary Embodiment]

As described above, in the second exemplary embodiment, the follow-up NS message is transmitted only in the case where the retransmitted NS message is not received before the predetermined waiting time elapses after the NS message is received. Thus, according to the second exemplary embodiment, the follow-up NS message is prevented from being transmitted in response to the meaningless one-way NS message, whereby it is possible to prevent the unnecessary communication workload from occurring in the network 1.

Third Exemplary Embodiment

In the exemplary embodiments described above, by using, as a trigger, the L2 address resolution performed by another communication device, each of the processes for acquiring the IPv6 address and the L2 address is performed. A detecting device 30 according to the third exemplary embodiment prompts L2 address resolution of other communication devices, thereby actively acquiring address information on the other communication devices. Below, the third exemplary embodiment will be described with focus being placed on things different from the first exemplary embodiment and the second exemplary embodiment, and the details same as those of these exemplary embodiments will not be repeated.

[Device Configuration]

FIG. 6 is a diagram schematically illustrating an example of a process configuration of the detecting device 30 according to the third exemplary embodiment. As illustrated in FIG. 6, the detecting device 30 according to the third exemplary embodiment further includes an inducement transmitting unit 38. The inducement transmitting unit 38 is also realized with the CPU 2 running the program stored in the memory 3.

The inducement transmitting unit 38 transmits an inducing message that causes other communication devices to transmit the NS message. This exemplary embodiment does not apply any limitation on a realization mode of this inducing message, provided that this inducing message is a communication message to which the communication device receiving this inducing message is tempted to reply. For example, the inducing message includes an Echo Request message in the Internet Control Message Protocol (ICMP), a synchronize (SYN) packet in a Transmission Control Protocol (TCP), a multicast Domain Name Service (mDNS), and a Link-Local Multicast Name Resolution (LLMNR).

The inducement transmitting unit 38 transmits the inducing message through L3 multicast and L2 broadcast. For example, "ff02::1" defined as a link-local all-nodes multicast address is set as a destination IP address of the inducing message.

The inducement transmitting unit 38 transmits inducing messages, each of which corresponds to each of plural IP prefixes recognized by the detecting device 30 as transmission source addresses of the inducing messages. For example, the inducement transmitting unit 38 transmits plural inducing messages having plural IPv6 addresses, which are set in the NIC 7 of the detecting device 30, set therein as transmission source addresses thereof. On the basis of the IP prefix of each of the IPv6 addresses of this detecting device 30 itself, the inducement transmitting unit 38 may generate an IPv6 address other than these IPv6 addresses, and may transmit a inducing message having this generated IPv6 address set therein as the transmission source address. With this configuration, the IPv6 address corresponding to the IP prefix set in this inducing message as the transmission source address thereof is set to the transmission source address of the NS message transmitted from the other communication device that is caused by this inducing message, whereby the detecting device 30 can acquire plural IPv6 addresses of another communication device on the basis of the transmission source addresses of this NS message.

In the case where the NS message transmitted from the other communication device in response to the inducing message transmitted by the inducement transmitting unit 38 is received, the solicitation receiving unit 31 determines whether to transmit the NS message in a follow-up manner according to the target address for L2 address resolution set in the received NS message. For example, in the case where the address of the detecting device 30 is set as the target address of the NS message, the solicitation receiving unit 31 does not cause the follow-up processing unit 33 to transmit an NS message that follows the received NS message. On the other hand, for example, in the case where an address of a device other than the detecting device 30 is set as the target address of the NS message, the solicitation receiving unit 31 causes the follow-up processing unit 33 to transmit a follow-up NS message in a manner similar to that in the exemplary embodiments described above. Note that the case where an address of a device other than the detecting device 30 is set as the target address of the NS message includes, for example, a case where another communication device voluntarily transmits an NS message, a case where an NS message is transmitted in a prompted manner in response to an inducing message transmitted from another communication device other than the detecting device 30, and a case where the detecting device 30 transmits an inducing message having an IPv6 address other than the IPv6 address of this detecting device 30 itself set therein as the transmission source address.

In the case where the address of the detecting device 30 is set as the target address of the received NS message, the information detecting unit 35 extracts, from the transmission source address of this received NS message, the IPv6 address and the L2 address concerning the start-point communication device 10 of this NS message.

[Example of Operation]

Below, a communication information detecting method according to the third exemplary embodiment will be described with reference to FIG. 7. FIG. 7 is a flowchart showing an example of operations performed by the detecting device 30 according to the third exemplary embodiment.

In the example illustrated in FIG. 7, the detecting device 30 transmits, through L2 broadcast, an inducing message having its own IPv6 address (2001::E) set therein as the transmission source address thereof (S71). At this time, a link-local all-nodes multicast address is set as the destination address of the inducing message. This inducing message is received by each of the communication devices (including the communication device 10 and the communication device 20) disposed in the network 1.

Each of the communication devices is urged to make a communication on the reception of this inducing message. Since no entry corresponding to the transmission source address (2001::E) of this inducing message exists in the Neighbor Cache, each of the communication devices performs L2 address resolution concerning the transmission source address. With this operation, each of the communication devices transmits an NS message having the IPv6 address (2001::E) set therein as the target address (S72, S73).

The detecting device 30 receives the NS message transmitted from each of the communication devices, and if it is determined that the target address set in the NS message is the IPv6 address of this detecting device 30 itself, the detecting device 30 acquires the IPv6 address and the L2 address concerning each of the communication devices on the basis of the transmission source address of the NS address. Note that the detecting device 30 may return an NA message in response to each of the received NS messages. In this case, after returning the NA message, the detecting device 30 may receive, from each of the communication devices, communication messages transmitted by the communication devices being prompted by the inducing message, and reply to the communication messages.

[Operation and Effect of Third Exemplary Embodiment]

As described above, in the third exemplary embodiment, the inducing message for prompting L2 address resolution of other communication devices is transmitted, and on the basis of the NS message transmitted from each of the communication devices by being urged by this inducing message, the IPv6 address and the L2 address concerning each of the communication devices are acquired. Thus, according to the third exemplary embodiment, it is possible to rapidly collect address information on each of the communication devices without waiting for other communication devices performing L2 address resolution.

Fourth Exemplary Embodiment

Even if IPv6 further penetrates as described above, it is important to identify the usage mode of IPv4 in each of the communication devices. Below, a communication information detecting device 30 that identifies the usage mode of IPv4 will be described as the fourth exemplary embodiment. The start-point communication device 10, the target communication device 20, and the communication information detecting device 30 each have a hardware configuration and a process configuration similar to those in the second exemplary embodiment described above. The start-point communication device 10, the target communication device 20, and the communication information detecting device 30 each have an IPv4 communication function. The detecting device 30 according to the fourth exemplary embodiment uses an address resolution protocol (ARP).

[Process Configuration]

The solicitation receiving unit 31 receives an ARP request message (hereinafter, also simply referred to as an ARP request) transmitted from the start-point communication device 10. The ARP request has an IPv4 address of the target communication device 20 set therein as the target address for L2 address resolution, and is transmitted through L2 broadcast. This ARP request may be called an address resolution request message. The solicitation receiving unit 31 receives this ARP request in a manner similar to that in the exemplary embodiments described above.

The generating unit 32 generates an ARP request having an IPv4 address of the target communication device 20, which is set in the ARP request received by the solicitation receiving unit 31, set therein as the target address for L2 address resolution.

The follow-up processing unit 33 transmits the ARP request generated by the generating unit 32 through L2 broadcast. Hereinafter, the ARP request transmitted by the follow-up processing unit 33 may be also referred to as a follow-up ARP request message or a follow-up ARP request, since it is transmitted following the ARP request transmitted from the start-point communication device 10.

The follow-up processing unit 33 transmits the follow-up ARP request generated by the generating unit 32 after a predetermined waiting time, which is set longer than a retransmission time for the APR request transmitted by the solicitation receiving unit 31, elapses after this ARP request is received. This predetermined waiting time is set in advance in the memory 3 in an adjustable manner. More specifically, the follow-up processing unit 33 starts a transmission timer upon receiving the ARP request, and transmits the follow-up ARP request once this transmission timer indicates that the predetermined waiting time has elapsed. On the other hand, if the ARP request retransmitted from the start-point communication device 10 is received again before the predetermined waiting time elapses after the reception of the ARP request, the follow-up processing unit 33 initializes this transmission timer according to the time when the retransmitted ARP request is received.

The advertisement receiving unit 34 receives an ARP reply message (hereinafter, also simply referred to as an ARP reply) returned from the target communication device 20 through unicast in response to the follow-up ARP request transmitted by the follow-up processing unit 33. This ARP reply may be also called an address resolution reply message.

The information detecting unit 35 extracts the L2 address and the IPv4 address concerning the target communication device 20 from the ARP reply received by the advertisement receiving unit 34. The information detecting unit 35 stores the extracted L2 address and IPv4 address in the communication information storage unit 36 so as to be associated with each other. Note that the ARP request and the ARP reply are well known, and hence, detailed descriptions thereof will not be made in this specification. The information detecting unit 35 may extract the L2 address and the IPv4 address concerning the start-point communication device 10 from transmission source information set in the ARP request, described above, received by the solicitation receiving unit 31. In this case, the information detecting unit 35 may store the extracted L2 address and IPv4 address concerning the start-point communication device 10 in the communication information storage unit 36 so as to be associated with each other.

The communication information storage unit 36 stores the L2 address and the IPv4 address in a state where they are associated with each other. In the case where the configuration of the fourth exemplary embodiment is combined with each of the exemplary embodiments described above, consequently, the information storage unit 36 stores the IPv6 address and the IPv4 address in a form that they are associated with the L2 address. With this configuration, it is possible to manage the IPv4 address and the IPv6 address set in each of the network interfaces with the L2 address being a key.

[Example of Operation]

Below, a communication information detecting method according to the fourth exemplary embodiment will be described with reference to FIG. 8. FIG. 8 is a sequence chart illustrating an example of operations performed by the detecting device 30 according to the fourth exemplary embodiment. In FIG. 8, the communication devices 10 and 20, and the detecting device 30 are illustrated in the rectangular boxes, and an IPv4 address of each of the communication devices is indicated in each of the rectangular boxes.

When starting a given communication with the target communication device 20, the start-point communication device 10 transmits an ARP request for L2 address resolution of the target communication device 20 in the case where no entry concerning the target communication device 20 exists in an ARP table of this start-point communication device 10 itself (S81). This ARP request is transmitted through L2 broadcast, and hence, the target communication device 20 and the detecting device 30 located within the network 1 and not extending beyond the router 8 receive this ARP request.

The target communication device 20 detects that an IPv4 address of this target communication device 20 itself is set as the target address of this ARP request, thereby transmitting an ARP reply to the start-point communication device 10 through unicast (S82).

The start-point communication device 10 receives this ARP reply, whereby the entry concerning the target communication device 20 can be registered in the ARP table. This makes it possible for the start-point communication device 10 to start the given communication with the target communication device 20 (S83). S81, S82, and S83 described above are a general flow of L2 address resolution in association with IPv4.

The detecting device 30 according to the fourth exemplary embodiment acquires the IPv4 address and the L2 address of the target communication device 20 by taking advantage of the flow of L2 address resolution between the start-point communication device 10 and the target communication device 20 as described above. In a similar way, it is possible for the detecting device 30 to acquire the IPv4 address and the L2 address of the start-point communication device 10.

Upon receiving the ARP request transmitted from the start-point communication device 10 through L2 broadcast (S81), the detecting device 30 transmits a follow-up ARP request after a predetermined waiting time elapses after the ARP request (S81) is received (S85). Although not illustrated in FIG. 8, in the case where the detecting device 30 receives the retransmitted ARP request before the predetermined waiting time elapses after the ARP request is received (S81), the detecting device 30 does not transmit the follow-up ARP request until the predetermined waiting time elapses after this retransmitted ARP request is received.

The detecting device 30 generates, as a follow-up ARP request, an ARP request having an IPv4 address of the target communication device 20, which is set in the received ARP request (S81), set therein as the target address for L2 address resolution, and transmits this follow-up ARP request (S85). The follow-up ARP request transmitted by the detecting device 30 is transmitted through L2 broadcast, and hence, is received by the start-point communication device 10 and the target communication device 20.

With this configuration, the target communication device 20 detects that the IPv4 address of this target communication device 20 itself is set as the target address of this follow-up ARP request, thereby transmitting this ARP reply to the detecting device 30 through unicast (S86).

Upon receiving the ARP reply for the detecting device 30, the detecting device 30 extracts the L2 address and the IPv4 address concerning the target communication device 20 from this received ARP reply. The detecting device 30 retains this extracted IPv4 address so as to be associated with the L2 address extracted in a similar way. Furthermore, it is possible for the detecting device 30 to acquire the IPv4 address and the L2 address of the start-point communication device 10 on the basis of the transmission source information in the ARP request received in S81.

[Operation and Effect of Fourth Exemplary Embodiment]

As described above, according to the fourth exemplary embodiment, by using the flow of L2 address resolution through ARP between the start-point communication device 10 and the target communication device 20, it is possible to acquire the IPv4 address and the L2 address concerning the target communication device 20. Thus, according to the fourth exemplary embodiment, it is possible to identify the usage mode of IPv4 of various communication devices existing in the network 1. Furthermore, according to the fourth exemplary embodiment, it is possible to acquire the IPv4 address and the L2 address concerning the start-point communication device 10 on the basis of the transmission source information in the ARP request.

As described above, according to the fourth exemplary embodiment, if an ARP is provided, it is possible to correctly identify the usage mode of IPv4 in each of the communication devices in the network 1 with a high versatility, without applying any specific restriction on the subject to be detected.

[Modification Example of Fourth Exemplary Embodiment]

In the fourth exemplary embodiment, the follow-up ARP request is transmitted after the predetermined waiting time, which is set longer than the retransmission time for the ARP request, elapses. However, the detecting device 30 may transmit the follow-up ARP request immediately after the ARP request is received. Furthermore, the detecting device 30 according to the fourth exemplary embodiment may further include the inducement transmitting unit 38 according to the third exemplary embodiment. In this case, it is only necessary for the inducement transmitting unit 38 to transmit the inducing message that causes other communication devices to transmit the ARP request.

Furthermore, in the fourth exemplary embodiment described above, the detecting device 30 transmits the follow-up ARP request following the ARP request transmitted by the communication device existing in the network 1. However, it may be possible to employ a configuration in which the detecting device 30 automatically generates target addresses for L2 address resolution, thereby actively transmitting the ARP requests. This is because the number of IPv4 addresses to be managed is significantly smaller than the number of IPv6 addresses. In this case, it is only necessary for the detecting device 30 to use a network address (prefix) of the IPv4 network (subnet) to which this detecting device 30 belongs, and sequentially set host addresses to the extent that they can be taken, thereby automatically generating the target addresses. In this case, the detecting device 30 may use an echo request and an echo reply of Internet Control Message Protocol (ICMP) instead of the ARP. However, there exists a communication stack implemented so as not to reply to an echo request in order to avoid unauthorized attacks, and hence, this method of using the echo request and the echo reply has poor reliability in terms of identifying the usage mode of IP.

[Modification Example]

In the examples of process configurations illustrated in FIG. 2 and FIG. 6, the detecting device 30 includes the communication information storage unit 36 and the inducement transmitting unit 38. However, the communication information storage unit 36 and the inducement transmitting unit 38 may be provided to another device. In this case, the information detecting unit 35 of the detecting device 30 accesses another device, thereby storing an IP address and an L2 address acquired in connection with a certain communication device in the communication information storage unit 36. Furthermore, the inducement transmitting unit 38 may transmit a inducing message having an IP address of another device set therein as the transmission source address.

Furthermore, in each of the exemplary embodiments described above, for the purpose of explanation, an example is given in which each of the communication devices (for example, the start-point communication device 10 and the target communication device 20) has one network interface. However, with each of the exemplary embodiments, it is possible to correctly identify the usage mode of IP also in the case where each communication device has plural network interfaces. In this case, each of the network interfaces is put in the same league as each of the communication devices described above.

Furthermore, these exemplary embodiments and these modification examples described above may be combined, provided that the details thereof do not contradict each other. According to an exemplary embodiment obtained by combining each of the first to third exemplary embodiments with the fourth exemplary embodiment, it is possible to acquire combinations of L2 addresses and IPv6 addresses and combinations of L2 addresses and IPv4 addresses. This makes it possible to determine relationships between the IPv4 addresses and the IPv6 addresses for each of the network interfaces (L2 addresses).

All or part of the exemplary embodiments and the modification examples described above can be specified in a manner described in the Supplementary Notes below. However, the exemplary embodiments and the modification examples are not limited to the descriptions below.

(Supplemental Note 1)

A communication information detecting device, including:
  a solicitation receiving unit that receives an address resolution request message transmitted from a start-point communication device through data link layer broadcast and having an Internet Protocol (IP) address of a target communication device set therein as a target address for data link layer address resolution;
  a generating unit that generates an address resolution request message having the IP address of the target communication device, which is set in the address resolution request message received by the solicitation receiving unit, set therein as a target address for data link layer address resolution;
  a follow-up processing unit that transmits the address resolution request message generated by the generating unit through data link layer broadcast;
  an advertisement receiving unit that receives an address resolution reply message returned from the target communication device through unicast in response to the address resolution request message transmitted by the follow-up processing unit; and
  an information detecting unit that extracts a data link layer address and an IP address concerning the target communication device from the address resolution reply message received by the advertisement receiving unit.

(Supplemental Note 2)

The communication information detecting device according to Supplemental Note 1, in which
  after a predetermined waiting time, which is set longer than a retransmission time for the address resolution request message, elapses after the solicitation receiving unit receives the address resolution request message, the follow-up processing unit transmits the address resolution request message generated by the generating unit.

(Supplemental Note 3)

The communication information detecting device according to Supplemental Note 1 or 2, in which
  the information detecting unit extracts a data link layer address and an IP address concerning the start-point communication device from transmission source information set in the address resolution request message received by the solicitation receiving unit.

(Supplemental Note 4)

The communication information detecting device according to Supplemental Note 3, further including:
  an inducement transmitting unit that transmits an inducing message that causes another communication device to transmit an address resolution request message, in which
  in the case where the solicitation receiving unit receives the address resolution request message transmitted from the other communication device in response to the inducing message transmitted by the inducement transmitting unit, the solicitation receiving unit determines whether to transmit the address resolution request message in a follow-up manner based on a target address for data link layer address resolution set in the received address resolution request message.

(Supplemental Note 5)

The communication information detecting device according to Supplemental Note 4, in which
  the inducement transmitting unit transmits plural inducing messages each having, as a transmission source address, an IP address corresponding to each of plural IP addresses of this communication information detecting device itself.

(Supplemental Note 6)

A communication information detecting method executed by a communication device, including:
  receiving an address resolution request message transmitted from a start-point communication device through data link layer broadcast and having an Internet Protocol (IP) address of a target communication device set therein as a target address for data link layer address resolution;
  generating an address resolution request message having the IP address of the target communication device, which is set in the address resolution request message received, set therein as a target address for data link layer address resolution;
  transmitting the generated address resolution request message through data link layer broadcast;
  receiving an address resolution reply message returned from the target communication device through unicast in response to the transmitted address resolution request message; and
  extracting a data link layer address and an IP address concerning the target communication device from the received address resolution reply message.

(Supplemental Note 7)

The communication information detecting method according to Supplemental Note 6, in which
  the transmitting the address resolution request message is performed after a predetermined waiting time, which is set longer than a retransmission time for the address resolution request message, elapses after a reception of the address resolution request message.

(Supplemental Note 8)

The communication information detecting method according to Supplemental Note 6 or 7, further including extracting, by the communication device, a data link layer address and an IP address concerning the start-point communication device from transmission source information set in the received address resolution request message.

(Supplemental Note 9)

The communication information detecting method according to Supplemental Note 8, further including:
  transmitting, by the communication device, an inducing message that causes another communication device to transmit an address resolution request message, and
  determining, by the communication device, in the case where the address resolution request message transmitted from the other communication device in response to the inducing message transmitted is received, whether to transmit the address resolution request message in a follow-up manner based on a target address for data link layer address resolution set in the received address resolution request message.

(Supplemental Note 10)

The communication information detecting method according to Supplemental Note 9, in which the transmitting the inducing message includes transmitting plural inducing messages each having, as a transmission source address, an IP address corresponding to each of plural IP addresses of the communication device itself.

(Supplemental Note 11)

A program that causes a computer to perform the communication information detecting method according to any one of Supplemental Notes 6 to 10.

(Supplemental Note 12)

A recording medium that records the program according to Supplemental Note 11 in a manner that can be read by a computer.

The present application claims priority based on Japanese Patent Application No. 2012-132204 filed in Japan on Jun. 11, 2012 and Japanese Patent Application No. 2012-262624 filed in Japan on Nov. 30, 2012, the disclosures of which are incorporated herein by reference in their entirety.

The invention claimed is:

1. A communication information detecting device, comprising:
   a solicitation receiving unit that is implemented by a central processing unit (CPU) and that receives a first address resolution request message transmitted from a start-point communication device through data link layer broadcast and having an Internet Protocol (IP) address of a target communication device set therein as a target address for data link layer address resolution;
   a generating unit that is implemented by the CPU and that generates a second address resolution request message having the IP address of the target communication device, which is set in the first address resolution request message received by the solicitation receiving unit, set therein as a target address for data link layer address resolution;
   a follow-up processing unit that is implemented by the CPU and that transmits the second address resolution request message generated by the generating unit through data link layer broadcast;
   an advertisement receiving unit that is implemented by the CPU and that receives an address resolution reply message returned from the target communication device through unicast in response to the second address resolution request message transmitted by the follow-up processing unit; and
   an information detecting unit that is implemented by the CPU and that extracts a data link layer address and an IP address concerning the target communication device from the address resolution reply message received by the advertisement receiving unit,
   wherein the generating unit sets a data link layer address and an IP address concerning itself in the second address resolution request message as a source address.

2. The communication information detecting device according to claim 1, wherein
   after a predetermined waiting time, which is set longer than a retransmission time for the first address resolution request message, elapses after the solicitation receiving unit receives the first address resolution request message, the follow-up processing unit transmits the second address resolution request message generated by the generating unit.

3. The communication information detecting device according to claim 1, wherein
   the information detecting unit extracts a data link layer address and an IP address concerning the start-point communication device from transmission source information set in the first address resolution request message received by the solicitation receiving unit.

4. The communication information detecting device according to claim 3, further comprising:
   an inducement transmitting unit that is implemented by the CPU and that transmits an inducing message that causes another communication device to transmit a first address resolution request message, wherein
   in the case where the solicitation receiving unit receives the first address resolution request message transmitted from said another communication device in response to the inducing message transmitted by the inducement transmitting unit, the solicitation receiving unit determines whether to transmit the second address resolution request message in a follow-up manner based on a target address for data link layer address resolution set in the received first address resolution request message.

5. The communication information detecting device according to claim 4, wherein
   the inducement transmitting unit transmits a plurality of inducing messages each having, as a transmission source address, an IP address corresponding to each of a plurality of IP addresses of this communication information detecting device itself.

6. A communication information detecting method executed by a communication device, including:
   receiving a first address resolution request message transmitted from a start-point communication device through data link layer broadcast and having an Internet Protocol (IP) address of a target communication device set therein as a target address for data link layer address resolution;
   generating a second address resolution request message having the IP address of the target communication device, which is set in the received first address resolution request message, set therein as a target address for data link layer address resolution;
   transmitting the generated second address resolution request message through data link layer broadcast;
   receiving an address resolution reply message returned from the target communication device through unicast in response to the transmitted second address resolution request message; and
   extracting a data link layer address and an IP address concerning the target communication device from the received address resolution reply message; and
   setting a data link layer address and an IP address concerning the communication device in the second address resolution request message as a source address.

7. The communication information detecting method according to claim 6, wherein
   the transmitting the address resolution request message is performed after a predetermined waiting time, which is set longer than a retransmission time for the first address resolution request message, elapses after a reception of the first address resolution request message.

8. The communication information detecting method according to claim 6, further including
   extracting, by the communication device, a data link layer address and an IP address concerning the start-point communication device from transmission source information set in the received first address resolution request message.

9. The communication information detecting method according to claim 8, further including:
   transmitting, by the communication device, an inducing message that causes another communication device to transmit a first address resolution request message; and determining, by the communication device, in the case where the first address resolution request message transmitted from said another communication device in response to the inducing message transmitted is received, whether to transmit the second address resolution request message in a follow-up manner based on a target address for data link layer address resolution set in the received first address resolution request message.

10. The communication information detecting method according to claim 9, wherein the transmitting the inducing message includes transmitting a plurality of inducing messages each having, as a transmission source address, an IP address corresponding to each of a plurality of IP addresses of the communication device itself.

11. A non-transitory computer-readable storage medium storing a program for causing a computer to realize:

a solicitation receiving unit that receives a first address resolution request message transmitted from a start-point communication device through data link layer broadcast and having an Internet Protocol (IP) address of a target communication device set therein as a target address for data link layer address resolution;

a generating unit that generates a second address resolution request message having the IP address of the target communication device, which is set in the first address resolution request message received by the solicitation receiving unit, set therein as a target address for data link layer address resolution;

a follow-up processing unit that transmits the second address resolution request message generated by the generating unit through data link layer broadcast;

an advertisement receiving unit that receives an address resolution reply message returned from the target communication device through unicast in response to the second address resolution request message transmitted by the follow-up processing unit; and an information detecting unit that extracts a data link layer address and an IP address concerning the target communication device from the address resolution reply message received by the advertisement receiving unit, wherein the generating unit sets a data link layer address and an IP address concerning itself in the second address resolution request message as a source address.

12. The non-transitory computer-readable storage medium according to claim 11, wherein after a predetermined waiting time, which is set longer than a retransmission time for the first address resolution request message, elapses after the solicitation receiving unit receives the first address resolution request message, the follow-up processing unit transmits the second address resolution request message generated by the generating unit.

13. The non-transitory computer-readable storage medium according to claim 11, wherein the information detecting unit extracts a data link layer address and an IP address concerning the start-point communication device from transmission source information set in the first address resolution request message received by the solicitation receiving unit.

14. The non-transitory computer-readable storage medium according to claim 13 that stores the program for causing the computer to further realize:

an inducement transmitting unit that transmits an inducing message that causes another communication device to transmit a first address resolution request message, wherein in the case where the solicitation receiving unit receives the first address resolution request message transmitted from said another communication device in response to the inducing message transmitted by the inducement transmitting unit, the solicitation receiving unit determines whether to transmit the second address resolution request message in a follow-up manner based on a target address for data link layer address resolution set in the received first address resolution request message.

15. The non-transitory computer-readable storage medium according to claim 14, wherein the inducement transmitting unit transmits a plurality of inducing messages each having, as a transmission source address, an IP address corresponding to each of a plurality of IP addresses of the computer itself.

* * * * *